United States Patent
Brauchle et al.

(10) Patent No.: US 6,495,276 B1
(45) Date of Patent: Dec. 17, 2002

(54) CHEMICAL REACTOR FOR A FUEL CELL SYSTEM

(75) Inventors: Stefan Brauchle, Biberach/Riss (DE); Matthias Wolfsteiner, Kirchheim (DE)

(73) Assignee: XCELLSIS GmbH, Kirchheim/Teck-Nabern (DE)

( * ) Notice: Subject to any disclaimer, the term of this patent is extended or adjusted under 35 U.S.C. 154(b) by 30 days.

(21) Appl. No.: 09/592,583

(22) Filed: Jun. 12, 2000

(30) Foreign Application Priority Data

Jun. 11, 1999 (DE) .......................... 199 26 608

(51) Int. Cl.⁷ ............................... H01M 8/04
(52) U.S. Cl. ................ 429/17; 429/19; 429/20
(58) Field of Search ................ 429/17, 19, 20

(56) References Cited

U.S. PATENT DOCUMENTS

| | | | | |
|---|---|---|---|---|
| 4,342,699 A | | 8/1982 | Palmer et al. ............... 549/259 |
| 4,873,368 A | | 10/1989 | Kadowaki et al. ........... 563/532 |
| 5,531,969 A | * | 7/1996 | Tamme et al. ............... 422/186 |
| 5,776,421 A | * | 7/1998 | Matsumura et al. ......... 422/197 |
| 5,911,503 A | * | 6/1999 | Braden et al. ............... 366/143 |
| 6,159,434 A | * | 12/2000 | Gonjo et al. ................. 422/191 |

FOREIGN PATENT DOCUMENTS

DE  195 26 886 C 1  9/1996

OTHER PUBLICATIONS

Yoshioka, "Reformers for Fuel Cells", 6001 Chemical Abstracts 113, XP00317621, Dec. 24, 1990 (JP 2–111601).
Koga et al., "Plate–type Reformers", 6001 Chemical Abstracts 119, XP000407895, Aug. 23, 1993 (JP 5–105406).

* cited by examiner

*Primary Examiner*—Carol Chaney
*Assistant Examiner*—Dah-Wei D. Yuan
(74) *Attorney, Agent, or Firm*—Crowell & Moring LLP

(57) ABSTRACT

A chemical reactor for a fuel cell system includes a reaction chamber containing at least two reaction partial chambers arranged parallel to one another. The effective reaction chamber cross section on the input side is adjustable by opening or closing the reaction partial chambers. A first reaction partial chamber type is open when the system is started is warmed up more rapidly under comparable operating conditions than the second reaction partial chamber.

30 Claims, 2 Drawing Sheets

CHEMICAL REACTOR FOR A FUEL CELL SYSTEM

BACKGROUND AND SUMMARY OF INVENTION

This application claims the priority of German patent document 199 26 608.5, filed Jun. 11, 1999, the disclosure of which is expressly incorporated by reference herein.

The present invention relates to a chemical reactor for a fuel cell system.

A device for methanol reformation is known from DE 195 26 886 C1, in which the effective length and/or the effective entrance cross section on the input side of a reaction chamber section for a high methanol reaction can be adjusted so that an essentially constant residence time of the gas mixture to be reformed is obtained in the reactor chamber section.

The load spread of the reactor system is thus improved and influenced less by the otherwise strong variation in the educt residence time. In the same way, undesired back reactions caused by residence times that are too long are avoided. Nevertheless, the behavior of the system is unsatisfactory under cold start conditions, since the reformation reactors usually employed have unavoidably high thermal capacities.

The goal of the present invention is to provide a chemical reactor for a fuel cell system that has improved cold start behavior.

This goal is achieved in a reformation reactor according to the present invention. The reactor according to the present invention has a reaction chamber with (1) at least one reaction partial chamber of a first type, and (2) at least one reaction partial chamber of a second type. Only the at least one reaction partial chamber of the first type is open when the system is started. The reaction partial chamber of the first type is designed so that it warms up more rapidly than a reaction chamber of the second type under the same operating conditions.

It is advisable to provide more than one reaction partial chamber of the first type. It is especially advantageous to locate the reaction partial chambers of the first type as homogeneously as possible inside the reaction chamber. The result is that the reaction chamber warms up rapidly, especially in the cold start phase, and homogeneously over its length. A temperature gradient is avoided between the input and the output of the reaction chamber.

Other objects, advantages and novel features of the present invention will become apparent from the following detailed description of the invention when considered in conjunction with the accompanying drawings.

DETAILED DESCRIPTION OF THE DRAWINGS

The present invention will now be described with reference to a reactor for methanol reformation but is not limited to this application. Instead, the chemical reactor according to the present invention may be used for gas generation; gas cleaning; and/or exhaust gas after-treatment in fuel cell systems, for example, for reformation reactors for methanol reformation, catalytic burners, and carbon monoxide oxidation units. The medium that flows through the reaction chamber can be liquid or gaseous. Using the chemical reactor according to the present invention for vehicles having fuel cell systems is especially advantageous.

Figure 1:
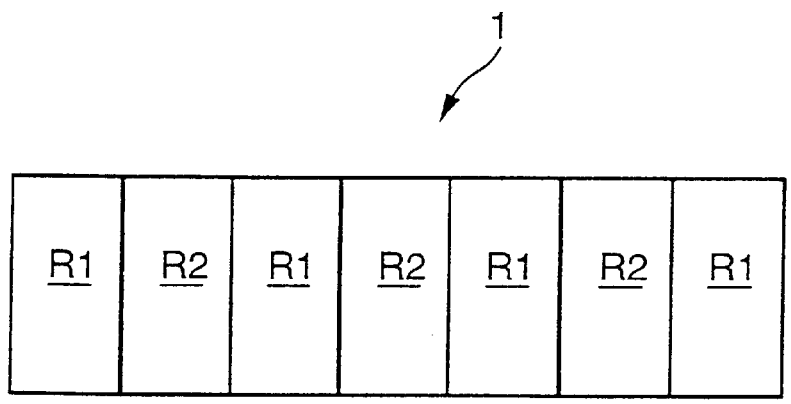
FIG. 1 is a schematic view of a reactor according to the present invention.

FIG. 1 shows schematically a preferred reaction chamber 1 for methanol reformation that has a number of reaction partial chambers marked R1 and R2. Reaction partial chambers R1 and R2 each contain catalysts. The arrangement corresponds to that in a reactor having a stacked design. Reaction chamber 1 is formed by the totality of reaction chambers R1 and R2. Supply pipes for media or cooling devices are not shown.

R1 and R2 are reaction partial chambers of a first and second type, respectivley. In the cold start phase of reactor 1, only reaction partial chambers R1 of the first type are open and a gas mixture to be reformed flows through them. Reaction partial chambers R2 of the second type are blocked in the cold start phase.

It is advantageous to design the reaction partial chambers R1 of the first type so that they warm up especially rapidly and are therefore optimized for the cold start phase. Thus, a reaction partial chamber R1 can include a catalyst that can be used for cold starts. In particular, a reaction partial chamber R1 can be loaded with a large quantity of a catalyst or a chemically especially active catalyst. If platinum is used as the catalyst, more platinum is contained in the reaction partial chambers R1 of the first type and therefore less platinum than usual is placed in the reaction partial chambers R2 of the second type so that with a suitable arrangement of the two reaction partial chamber types in reaction chamber 1 an advantageous saving of platinum is achieved. An additional possibility is to design the thermal coupling suitably for the environment and/or the thermal capacity of reaction partial chambers R1 of the first type to warm up these reaction partial chambers rapidly.

In a preferred embodiment, the reaction chamber has at least one each of a reaction partial chamber of the first and second type.

In another preferred embodiment, reaction chamber 1 has a plurality of reaction partial chambers R1, R2 of the first and second types. Advantageously, the reaction partial chambers of the first type R1 are distributed within reaction chamber 1 so that they, when traversed only in the cold start phase by a reforming gas mixture, warm up the reaction chamber essentially homogeneously. Along the stack, no temperature gradient, with a cold end and a warm end of the stack, forms. The traversed reaction partial chambers R1 of the first type are warmed and rapidly reach the temperature required for chemical reaction. The reaction partial chambers R2 of the second type that are not traversed by a flow are then warmed by the adjacent reaction partial chambers R1 of the first type so that they are ready to operate more rapidly when the cold start phase is complete. The cold start phase with its unfavorable operating conditions is shortened as a result.

It is particularly favorable to provide a reaction partial chamber R1 of the first type as the first and last reaction partial chambers in the stack. In this way, undesired cooling of the reactor stack by thermal coupling outward is sharply restricted.

Reaction partial chambers R1 of the first type are distributed individually, for example, alternating with reaction partial chambers R2 of the second type, and largely homogeneously within reaction chamber 1. It is also possible to design several adjacent reaction chambers as reaction chambers R1 of the first type and to distribute such reaction partial chamber groups within the reaction chamber.

After a cold start phase, the reaction partial chambers R2 of the second type, preferably preheated by reaction partial chambers R1 of the first type, are opened and the gas mixture to be reformed flows through them. The reaction partial chambers R1 of the first type are then closed off completely.

Figure 2:
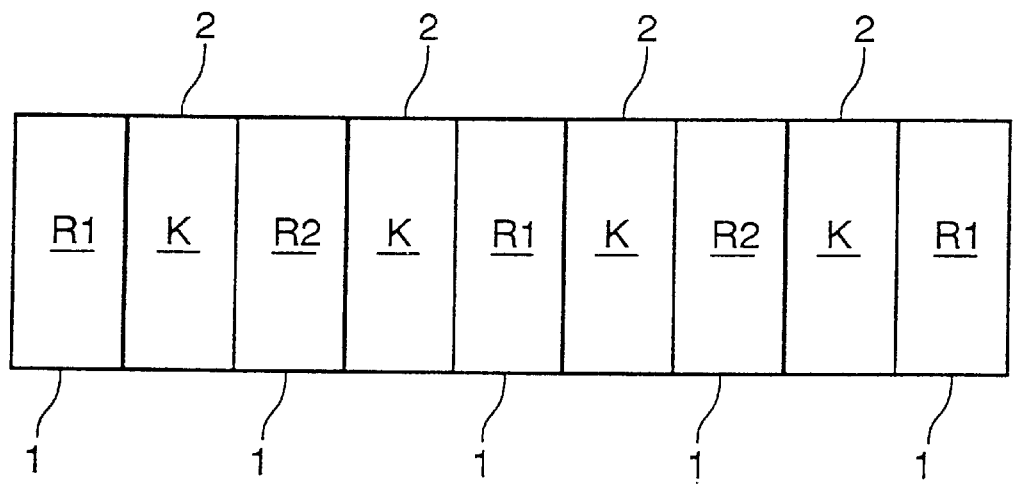
FIG. 2 is a schematic diagram of a reactor with the reaction and cooling chambers stacked.
Figure 3:
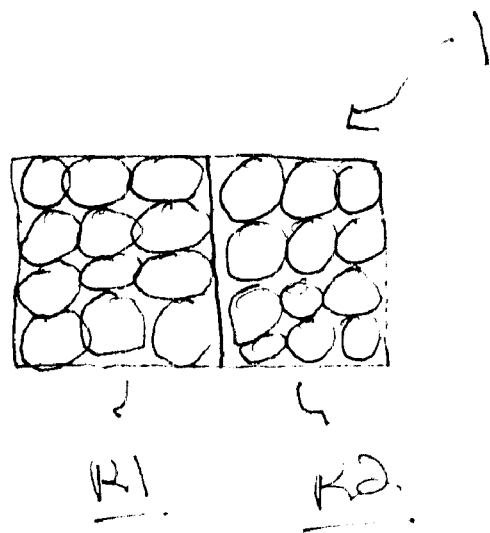
FIG. 3 is a schematic diagram of a tube bundle reactor according to the present invention.

FIG. 2 shows a preferred embodiment of the device according to the present invention in schematic form. The device has a reaction chamber 1 and a cooling chamber 2. The arrangement corresponds to a stack. As in the example of FIG. 1, however, even a tube bundle reactor can be so designed. Reaction chamber 1 is formed by the totality of reaction partial chambers R1, R2. The cooling chamber is formed by the totality of cooling partial chambers K.

The reaction partial chambers R1, R2 of the reaction chamber and the cooling partial chambers K of cooling chamber 2 are arranged alternately so that at least one cooling partial chamber K is associated with each reaction partial chamber R1, R2.

It is advantageous to close the shut-off reaction partial chambers R1 or R2 and to open the associated cooling partial chambers so that the blocked reaction partial chambers R1, R2 are not cooled and open reaction partial chambers R1, R2 are cooled. Then cooling can take place in cooling chambers in the usual manner with an endothermal reaction or with a passive heat exchange medium, such as oil or water.

In addition to the possibility described above of loading reaction partial chambers R1 of the first type with more, or more active, catalyst than the reaction partial chambers R2 of the second type, the more rapid heating of reaction partial chambers R1 of the first type can also be achieved (1) by thermally decoupling these reaction partial chambers R1 from corresponding cooling partial chambers K; (2) by less cooling medium; or (3) by less reaction in an endothermal reaction, than cooling partial chambers K corresponding to reaction partial chambers R2 of the second type.

It is also possible to run the reactor according to the present invention in normal operation so that depending on the power demand on the system supplied by the reactor, for example a fuel cell system, the reaction partial chambers are opened or closed. Normal operation means that reaction chamber 1 is at the desired operating temperature. Full load corresponds to the state in which all the reaction partial chambers R1 and/or R2 are open and the gas mixture to be reformed is to be reacted. All configurations of reaction partial chambers R1 and R2 can then be opened or only the reaction partial chambers R2 of the second type may be open. It is advantageous when reaction partial chamber R1 of the first type are optimized specially for use in a cold start. In the following, for the sake of simplicity, it is assumed that all reaction partial chambers R1 and R2 are open under full load. of course, the alternative design can be operated in the manner described below.

If less power is required (i.e., if less reformate is to be produced), a corresponding number of reaction partial chambers R1, R2 are shut off. It is then advantageous when closing reaction partial chambers R1, R2 to note that the shut-off reaction partial chambers R1, R2 in reaction chamber 1 are distributed essentially homogeneously so that no undesired temperature gradient can form and the closed reaction partial chambers R1, R2 do not cool off excessively since they are still heated by the adjacent open reaction partial chambers. During the subsequent opening of the blocked reaction partial chambers R1, R2 they are then returned to operating temperature more rapidly. The temperature gradient between the closed and open reaction partial chambers R1, R2 can thus be minimized.

In addition, it is advisable with successive shut-off cycles of reaction partial chambers R1, R2 to ensure that reaction partial chambers R1, R2 that are as different as possible are closed in cycles that follow one another directly. In this way, the catalyst of the reaction chamber can be used uniformly. The reaction partial chambers R1, R2 that are closed during normal operation and/or reaction partial chambers R1, R2 that are open can also be combined into groups and distributed in reaction chamber 1 as described in the cold start phase in the case of the partial shutdown.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A chemical reactor for a fuel cell system, comprising:
   at least two reaction partial chambers that are parallel to one another and through which a medium can flow,
   wherein an input-side cross section of the reactor is adjustable by opening or closing the at least two reaction partial chambers,
   wherein only at least one first reaction partial chamber is open when the fuel cell system is started and is warmed up more rapidly than at least one second reaction partial chamber under comparable operating conditions, and
   one or more cooling chambers, wherein the reaction chamber is coupled with the cooling chambers in a plate reactor.

2. A reactor according to claim 1, wherein each of the at least two reaction partial chamber is coupled with a cooling partial chamber.

3. A reactor according to claim 1, wherein a first and a last reaction partial chambers in the plate reactor are at least one first reaction partial chambers.

4. A reactor according to claim 1, wherein the at least two reaction partial chambers and the cooling partial chambers are opened or closed simultaneously.

5. A chemical reactor for a fuel cell system, comprising:
   at least two reaction partial chambers that are parallel to one another and through which a medium can flow,
   wherein an input-side cross section of the reactor is adjustable by opening or closing the at least two reaction partial chambers,
   wherein only at least one first reaction partial chamber is open when the fuel cell system is started and is warmed up more rapidly than at least one second reaction partial chamber under comparable operating conditions, and
   wherein the reaction chamber is a tube bundle reactor.

6. A process for operating a chemical reactor for a fuel cell system having a reaction chamber through which a medium can flow, said process comprising:
   opening at least one first reaction partial chamber through which a gas mixture can flow;
   closing at least one second reaction partial chamber through which the gas mixture can flow;
   flowing the gas mixture through the at least one first reaction partial a chamber;

catalytically reforming the gas mixture, thereby bringing the reaction chamber to an operating temperature and preheating the at least one second partial reaction chamber;

opening the at least one second reaction partial chamber;

closing the at least one first reaction partial chamber;

flowing the gas mixture through the at least one second reaction partial chamber; and catalytically reforming the gas mixture, wherein the at least one first reaction partial chamber is open when the fuel cell system is started and is warmed up more rapidly than the at least one second reaction partial chamber under comparable operating conditions.

7. A process according to claim 6, wherein an input-side cross section of the reaction chamber is adjusted by opening or closing the at least one first partial reaction partial chamber and the at least one second partial reaction chamber.

8. A process according to claim 6, further comprising opening and closing cooling chambers, thereby cooling the at least one first partial reaction chamber or the at least one second partial reaction chamber.

9. A chemical reactor for a fuel cell system, comprising a reaction chamber that includes:

at least one reaction partial chamber of a first type;

at least one reaction partial chamber of a second type;

wherein the reaction partial chambers of the first and second types are arranged in parallel;

wherein the at least one reaction partial chamber of the first type is open and the at least one reaction partial chamber of the second type is closed during start-up of the fuel cell system; and wherein the at least one reaction partial chamber of the first type can be warmed up more rapidly than the at least one reaction partial chamber of the second type under comparable operating conditions.

10. A reactor according to claim 9, wherein an input-side cross section of the reactors adjustable during operation to open or close the reaction partial chambers.

11. A reactor according to claim 9, wherein the at least one reaction partial chamber of the first type is closed and the at least one reaction partial chamber of the second type is open during normal operation of the fuel cell system.

12. A reactor according to claim 9, wherein the at least one reaction partial chamber of the first type has a lower thermal capacity than the at least one reaction partial chamber of the second type.

13. A reactor according to claim 9, wherein the at least one reaction partial chamber of the first type has a catalyst with a higher activity than a catalyst in the at least one reaction partial chamber of the second type.

14. A reactor according to claim 9, wherein the at least one reaction partial chamber of the first type is less thermally coupled to a cooling source than the at least one reaction partial chamber of the second type.

15. A reactor according to claim 9, wherein the at least one reaction partial chamber of the first type is cooled to a lesser degree than the at least one reaction partial chamber of the second type.

16. A reactor according to claim 9, wherein the at least one reaction partial chamber of the first type includes a plurality of reaction partial chambers of the first type.

17. A reactor according to claim 16, wherein the plurality of reaction partial chambers of the first type are distributed individually inside the reaction chamber.

18. A reactor according to claim 16, wherein the plurality of reaction partial chambers of the first type are combined into groups of several adjacent reaction partial chambers and wherein the groups are distributed homogeneously inside the reaction chamber.

19. A reactor according to claim 9, further comprising at least one cooling chamber, wherein the reaction chamber is coupled with the at least one cooling chamber in a plate reactor.

20. A reactor according to claim 19, wherein each of the reaction partial chambers is coupled with a cooling partial chamber.

21. A reactor according to claim 19, wherein a first and a last reaction partial chambers of the parallelly arranged reaction partial chambers are reaction partial chambers of the first type.

22. A reactor according to claim 19, wherein at least one of the reaction partial chambers and the cooling partial chamber coupled to the at least one reaction partial chamber are opened or closed simultaneously.

23. A reactor according to claim 9, wherein the reaction partial chambers are opened or closed depending on a volume of a gas mixture to be reformed.

24. A reactor according to claim 23, wherein the reaction partial chambers that are open or closed are distributed in the reaction chamber so that a temperature gradient between the closed and open reaction partial chambers is minimized.

25. A reactor according to claim 9, wherein the reaction chamber is a tube bundle reactor.

26. A reactor according to claim 16, wherein the plurality of reaction partial chambers of the first type are distributed homogeneously inside the reaction chamber.

27. A reactor according to claim 9, comprising a reformation reactor.

28. A reactor according to claim 9, comprising a catalytic burner.

29. A reactor according to claim 9, comprising a carbon monoxide oxidation reactor.

30. A fuel cell system comprising the chemical reactor of claim 9.

* * * * *